United States Patent [19]

Olivo, Jr.

[11] Patent Number: 4,888,796
[45] Date of Patent: Dec. 19, 1989

[54] PROGRAM MATERIAL SCREENING DEVICE

[76] Inventor: John W. Olivo, Jr., 740 Central Ave., Hammonton, N.J. 08037

[21] Appl. No.: 91,646

[22] Filed: Aug. 31, 1987

[51] Int. Cl.$^4$ .................. H04M 1/00; H04M 11/08
[52] U.S. Cl. .................. 379/101; 340/825.31; 379/87; 379/95; 379/199; 455/26.1
[58] Field of Search .................. 379/77, 87, 95, 90, 379/69, 188, 199, 101; 360/13, 27, 72.1; 358/349; 455/26.1; 340/825.31, 825.3

[56] References Cited

U.S. PATENT DOCUMENTS

| | | | |
|---|---|---|---|
| 4,114,139 | 9/1978 | Boyd et al. | 340/825.31 |
| 4,266,098 | 5/1981 | Novals | 379/77 |
| 4,536,791 | 8/1985 | Campbell et al. | 358/263 X |
| 4,588,857 | 5/1986 | Aersen | 379/77 X |
| 4,591,664 | 5/1986 | Freeman | 379/73 |
| 4,598,288 | 7/1986 | Yarbrough et al. | 358/349 X |
| 4,600,921 | 7/1986 | Thomas | 340/825.31 |
| 4,602,297 | 7/1986 | Reese | 360/14.1 |
| 4,695,904 | 9/1987 | Shinyagaito et al. | 358/342 |
| 4,718,107 | 1/1988 | Hayes | 455/4 |

FOREIGN PATENT DOCUMENTS

| | | | |
|---|---|---|---|
| 0135783 | 4/1985 | European Pat. Off. | 455/26.1 |
| 0052683 | 4/1980 | Japan | 358/349 |

Primary Examiner—Thomas W. Brown

[57] ABSTRACT

A program material screening device is provided whereby the owner of a program signal receiving device such as a telephone, television, radio, VCR, or the like may automatically and selectively prevent the reception and replay by the receiving device of unwanted transmissions. The screening device is capable of recognizing non-interfering material content signals co-transmitted with the program signals received by the receiving device, and is capable of automatically disabling the receiving device in response to recognition of the material content signal.

20 Claims, 5 Drawing Sheets

PROGRAM MATERIAL SCREENING DEVICE

BACKGROUND OF THE INVENTION

The present invention relates to a device for controlling the receipt of information or material which is transmitted electronically, such as by broadcast or via wire, or reproduced from electromagnetic storage media, such as video or audio tapes and magnetic disks. More particularly the invention is directed to a program material screening device, for example, a telephone device for preventing the receipt of unwanted telephone messages.

The present invention addresses several recent problems arising from the advent of sexually explicit or excessively graphic or violent material being made freely available to minors through various unregulated media, including pre-recorded telephone messages, taped and live "shock" radio, and rented or purchased video tapes.

Heretofore, there have not been any restrictions imposed on the purveyors of such program material, although parents and governmental officials have expressed strong interest in controlling its availability or at least preventing minors from freely receiving it. Because overburdensome government regulation or censorship of the providers of explicit program material is limited by the First Amendment and interferes with the legitimate desires of adults who wish to receive such material, there is a strong need to provide a means for selectively screening the receipt of an unwanted program material signal when the receiver (i.e., radio, telephone, VCR) is operated by a child or other unauthorized person.

In the realm of explicit messages or information transmitted via telephone, several solutions have been proposed to allow a parent or other authority to restrict receipt through their telephone lines of selected types of program material. These include conventional blocking methods, such as a programmable device that the telephone owner would pre-program with all telephone numbers to be restricted or blocked. The problem with such a device is that each and every telephone number accessing unwanted program material would have to be programmed into the device, and frequent reprogramming on the part of the owner would be necessary since the telephone numbers accessing the unwanted material continually change and multiply.

Another solution proposed would involve scrambling the program material at the origin, thereby restricting access to those who are equipped with descramblers. Though functional, such a solution would require expensive scrambling equipment on the part of the message programmers as well as on the part of the telephone owner, who would have to purchase descrambling equipment in order to receive the program material.

Another solution suggested includes the use of personal identification numbers (PINs) which would be obtained by the user for receiving the explicit program material. In practice, only callers with valid PINs would receive exlicit program material, and the assignment of PINs could be appropriately restricted. While this appears to be a viable solution, it would involve tremendous expense on the part of the telephone companies to install the central switching equipment necessary to handle a PIN system. Furthermore, any minors who illicitly discover a valid PIN could circumvent this system.

The present invention is a new and innovative solution to the aforementioned problems. It combines the advantages of requiring minimum effort and expense on the part of the program provider and minimum effort on the part of the potential receiver who wishes to restrict access to the program material, while requiring no additional effort on the part of legitimate customers who wish to freely receive such program material. The device of this invention can be implemented on all types of program material receivers, including but not limited to telephones (including coin operated and private), radios, video cassette recorders, televisions, etc.

SUMMARY OF THE INVENTION

The method according the the present invention involves adding or incorporating a material content signal onto or into program material, which signal is carried with the program material as it is transmitted to receivers (i.e., radios, telephones, televisions, VCRs). In accordance with this invention, receiver owners or operators can equip their receiver with a program material screening device capable of detecting the material content signal, and the program screening device can be selectively set to automatically disconnect or disable the receiver, preventing receipt of the program material.

The method is carried out by supplementing the program material at the program source with an audible or inaudible material content signal. The signal could either preface the transmission of the material or be provided periodically, randomly, or continuously throughout the program material transmission.

The material content signal may be peculiar to the type or rating of the program material. For example, a material content signal indicating PG-13, R or X movie ratings could be recorded with the program material originally or alternatively, onto video cassettes released through stores or video rental outlets.

The material content signal is detected at or prior to receipt of the program material by the receiver or program material output device (PMOD). The program material screening device of this invention selectively enables or disables the PMOD, in accordance with the wishes of the user or owner's (or other authority's) authorization.

Generally, the program material screening device of the present invention is incorporated as a part of or installed as an ancillary fixture of the receiver or PMOD, which can be a telephone, radio, VCR, television, computer, or any device capable of receiving and replaying transmitted or recorded program material in a humanly perceivable form. The program material screening device is installed so as to receive incoming transmitted program material simultaneously with the receiver or to receive the transmitted program material prior to the receiver, and then to disable the receiver from replaying the transmitted program material if a selected material content signal is detected by the screening device.

The system of the present invention differs from a system where the program material is scrambled in that the program material signal itself is never altered and, without the intervention of the program material screening device of the invention, is received without detectable alteration by receiver owners who are not concerned with screening the transmitted program material. The material content signal, which may be added to the transmission at the origin or added to a prerecorded program by a rating authority, is a simple coding signal generated by existing equipment. The screening device of the invention need only be able to detect the presence or absence of the material content signal and does not receive or replay the transmitted program material, as is the case with a descrambling device.

DETAILED DESCRIPTION OF THE INVENTION

Figure 1:
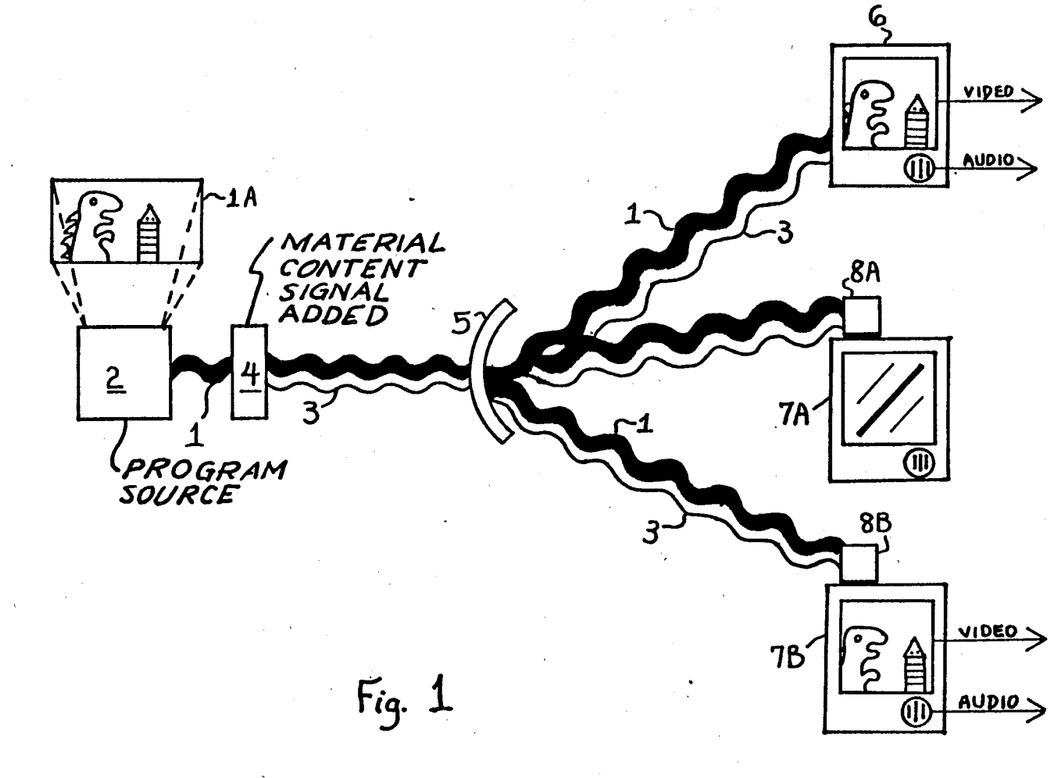
FIG. 1 is an overall block diagram of the present invention showing as an example a broadcast television embodiment.

Referring first to FIG. 1, a block diagram depicts generally the operation of communication systems according to the present invention.

A program material signal represented by a sinusoidal wave (1) emanates from a program material source (2) such as a television station, radio station, video or film camera, sound recording device, pre-recorded telephone message playback device, or the like. If the program material is of an explicit nature or contains material which is desired to be screened from unauthorized persons (e.g., minors or children) the program material signal (1) is "tagged", or supplemented with a companion material content signal (MCS) by conventional equipment (4).

The companion MCS (3) is broadcast or transmitted to receivers along with the program signal (1) but in no way disturbs the transmission or alters the content of the program signal (1). The companion MCS (3) is most advantageously applied to the program signal (1) at the source, that is, by the program signal supplier (2), preferably using existing broadcasting/transmission equipment. Most preferably, the companion MCS is a simple tone or series of tones, which may be audible or inaudible, and which may be readily produced by the same equipment used to generate the program material signal (1), for example, audible tones, inaudible data signals, etc.

Referring again to FIG. 1, the program signal (1) and its companion material content signal (3) is typically distributed to the public via a transmission network (5), which can be a television or radio broadcast network, a telephone network, the broadcast area of a radio or television station, microwave or satellite distribution networks, and the like. For prerecorded materials such as magnetic tapes, discs, records, laser readable discs, etc., the transmission network (5) can be any system through which such prerecorded materials are distributed to the public, such as video retail or rental outlets, record stores, and the like.

Through the signal distribution network (5), the program signal (1) and MCS (3) are conveyed to privately owned conventional receivers (6, 7A, 7B), which are capable of receiving the program signal (1) and replaying it in an audible and/or viewable form. Typical receivers are television sets, telephones, radios, video or audio tape players, projectors, and the like. The owners of receivers who are unconcerned about screening the program material represented by the program signal (1) will freely receive the program signal (1) without any interference or interruption occasioned by the co-transmission of the companion material content signal (3) (See receiver designated 6 in FIG. 1.)

Owners of receivers desiring to screen program material distributed via the program signal (1) will equip their receivers 7A, 7B) with the program material screening device of the present invention (8A, 8B). The program material screening device (8A, 8B) is capable of detecting the presence of the companion material content signal (3) and is connected to the receiver (7A, 7B) in such a way as to be capable of preventing replay in an audible and/or viewable form of the program signal (1). The program material screening device (8A, 8B) may be preset to interrupt or prevent playback (8A) of the program signal (1) carrying the companion MCS (3) indicating explicit program material content or program content the receiver user/owner may wish, for whatever reason, not to receive. When the companion MCS is detected by the program material screening device (8A) preset to screen the programming, the ability of the receiver (7A) to receive or replay the program signal (1) is interrupted or disabled by the device (8A) and no audio output or video output emanates from the receiver (7A).

In the case where the program material screening device (8B) is preset to allow replay of the program signal (1), normal audio and video output emanate from the receiver (7B).

As an example to illustrate the operation of the system depicted in FIG. 1, the scenario of a television broadcast of an "R-rated" movie will be used. In this scenario, the aural and visual image of the R-rated movie (1A) is converted at a television station (2) to a broadcast signal (1). The television station operator or an independent reviewing authority simulcasts a material content signal (3), e.g., an inaudible tone or comparable data subcarrier, indicating the R rating of the movie (1A). Such technology is similar to Videotext, a well known technology. By using the vertical blanking interval, the producers of video sources can supplement the program material with an MCS.

Both the movie signal (1) and the R content signal (3) are distributed (5) throughout the broadcast viewing area of the television station (2), including homes having television sets designated 6, 7A and 7B. The owner of television set 6 is unconcerned with screening broadcast television signals and therefore has not equipped the television set 6 with a program material screening device. This owner receives the movie signal (1) and is unaware of the presence of the R content indicator signal (3).

The owner of television set 7A wishes to prevent the reception of R-rated movies in his or her home, and has equipped the television set 7A with a program material screening device (8A) in accordance with the invention. Even in the owner's absence, the screening device (8A) detects the simulcast R content signal (3) and prevents the television set (7A) from replaying the movie (1A) from the broadcast signal (1).

The owner of television set 7B is also concerned about the reception of explicit program material, and accordingly has equipped his or her television set (7B)

with a program material screening device (8B), however, in this scenario, the owner of television set 7B wishes to view the R-rated movie (1A) and selectively presets the screening device (8B) so as to premit replay of the movie (1A).

It will be immediately understood by persons skilled in this art that the system depicted in FIG. 1 is readily adapted to any form of communication relying on the transmission and/or playback of electronic signals, and the device of the present invention is readily adapted to all such uses.

Similarly, by resorting to different tones or different types of material content signals, the program material screening device can be preset to be more or less restrictive and to differentiate between types of programming. For example, a different program material content signal can be assigned for each of the Motion Picture Association of America (MPAA) ratings, i.e., G, PG, PG-13, R, and X, and the program material screening device can be preset to distinguish between each different MCS and operate according to an owner's program, for instance, to allow replay of PG and PG-13 rated signals, while interrupting R and X rated signals.

In like manner, different material content signals can distinguish between violent subject matter and sexually explicit subject matter, between entertainment and political programming, can screen out or locate advertisements within a program signal, or distinguish on any other basis.

The MCS can take any one of a wide variety of forms. It can be a tone transmitted through telephone lines, it can be a radio signal simulcast with a radio or television program at a non-interfering radio frequency. The MCS can be transmitted as part of the program signal or telecast by a third party, independently from the transmission of the program signal. It can be prerecorded on video tape along with program material or incorporated by the user when recording home audio and video tapes. The MCS may be transmitted continuously with the program signal or transmitted in advance of the program signal to disable the receiver before the program signal reaches it. Alternatively, the MCS may be applied only to portions of a program signal, in order to edit out only the objectional parts of a program, e.g., "shock radio", while permitting transmission of acceptable subject matter.

The MCS may be supplied by the broadcaster or program producer or provider, a third party "watch dog" organization, or a governmental regulatory organization. The format of the MCS may be set by governmental standardization, provided by broadcasters and other providers as a public service, or provided by a third party, either as a public service or funded by subscription.

Whatever the source of the program signal and companion MCS, the program material screening device of the present invention must be capable of recognizing the MCS and be capable of preventing or disrupting receipt or playback of the program signal in response to the MCS, if desired.

Although the following description is devoted primarily to an embodiment of this invention relating to telephone transmission of "adult" messages, the practitioner will recognize that other methods of communication and many other embodiments of this invention relating to all forms of electronic communications media are contemplated by this disclosure.

Figure 2:
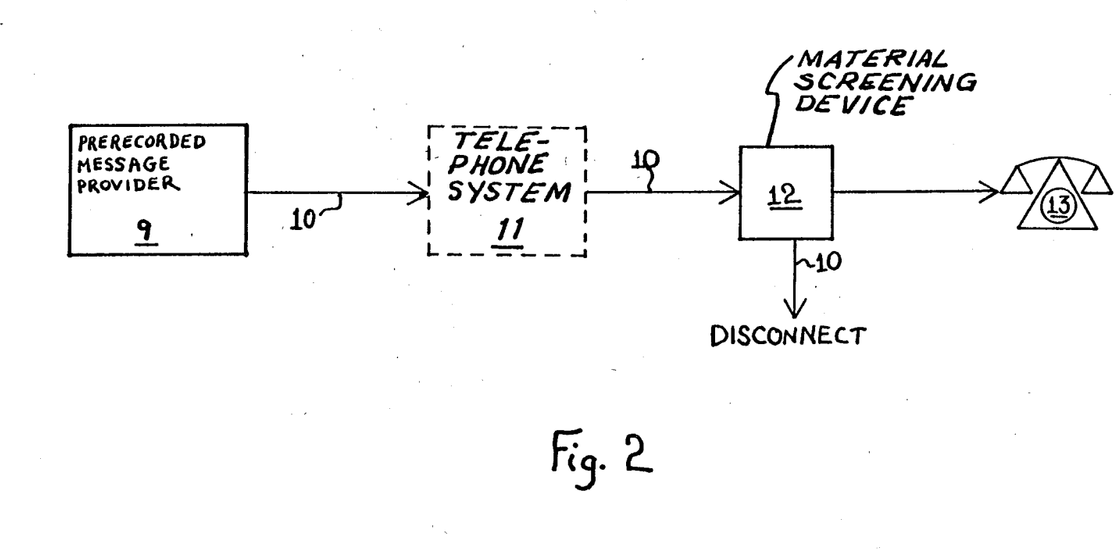
FIG. 2 is a block diagram of one embodiment of the present invention adapted to a conventional telephone.

FIG. 2 represents an embodiment of this invention suitable for use in a telephone system. This embodiment can be used, for example, by a parent to prevent the reception of prerecorded adult messages on household phones. The adult message provider (9) transmits prerecorded adult messages (10) in response to incoming calls initiated from a private or public telephone (13). The adult message (10) is conveyed through the commercial telephone system (11) as any other telephone message or communication. However, all adult messages are provided with a companion MCS, which in this embodiment is a series of tones recorded at the beginning of the recording, prior to the start of the adult message. The transmitted adult message (10) is received by the program material screening device (12) connected to the telephone (13). The screening device (12) detects the preceding MCS tones and in response disconnects the telephone (13) from the telephone system, terminating the call before the adult message is received. Incoming telephone messages without the preceding MCS tones are not disconnected and are allowed to pass normally to the telephone (13).

Adult operators generally use a tape playback apparatus with a series of tape loops containing the prerecorded messages. Such playback setups are familiar to the prerecorded telephone message industry. The only modification necessary in this embodiment to the taped adult messages is that a series of prefacing or periodic tones will be emitted or recorded on the existing tape track. Such tones embodying the MCS in this example could advantageously correspond to the existing tones emitted by "touch-tone" telephones. Such tones could be the dual tone multi-frequency variety (DTMF), which are well understood and heavily utilized in the telephone industry. The tones used in this embodiment could be, for example, the tones emitted by dialing the keys *, 3, *. Use of the "star" (*) key is advantageous in that it would avoid simulating any established area code or local prefix. A DTMF oscillator may be used to produce prefacing tones in the case where live telephone messages are employed.

The system described in this embodiment requires no modifications of existing telephone lines or switching equipment, and thus the involvement of the telephone operating companies is not required.

Figure 3:
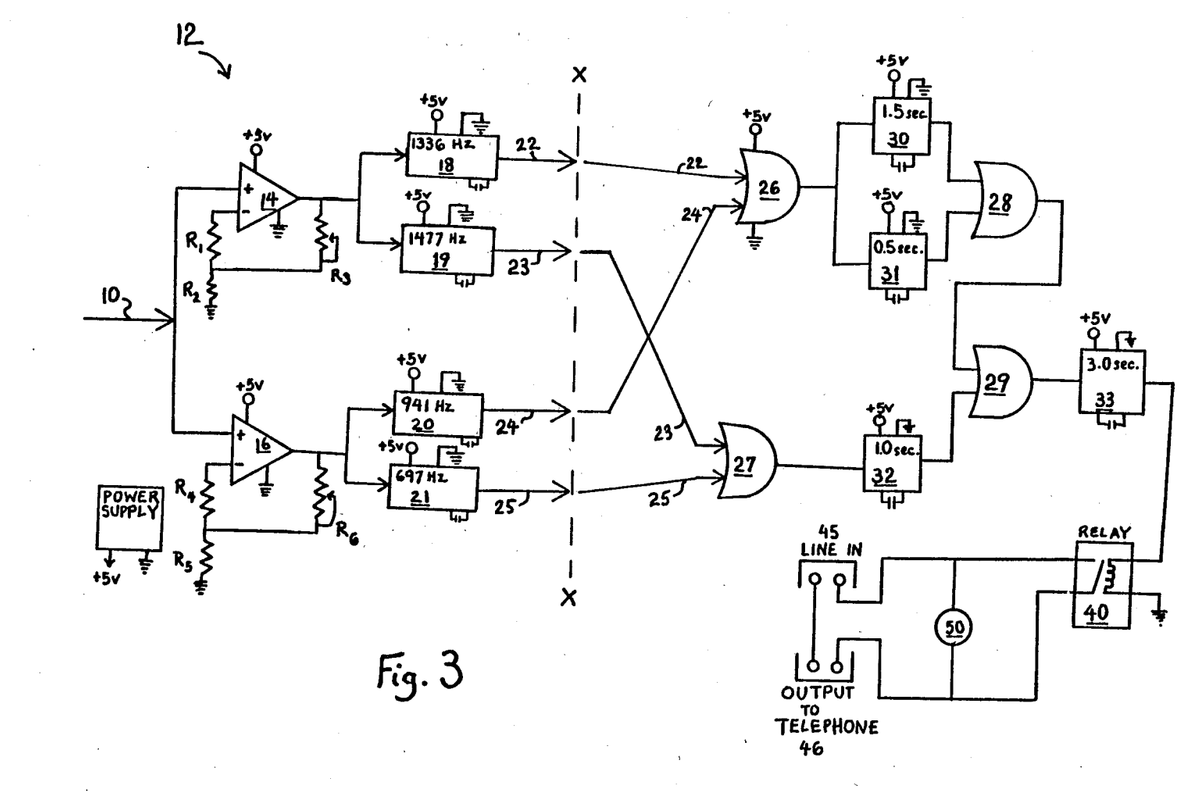
FIG. 3 is a schematic diagram of the embodiment for a decoder for use in a telephone system according to the present invention.

FIG. 3 is a schematic diagram of possible circuitry for the telephone program material screening device embodiment of this invention. To the left of dotted line X—X, analog circuitry is used; to the right of line X—X, digital circuitry is used. The incoming adult telephone message signal (10) enters the screening device (12) and passes to two operational amplifiers (14 and 16), which respectively operate as "high pass" and "low pass" filters. The operational amplifiers are set to pass only certain frequencies. Since the audio spectrum of telephone lines is quite limited, efficient use must be made of the spectrum. Operational amplifier (14) acts as a high pass filter with a 1 kilohertz (Khz) cutoff frequency. Hence, frequencies below 1 Khz will be greatly attenuated. The exact degree of attenuation is not critical. Operational amplifier (16) acts as a low pass filter. Resistors ($R_1$, $R_2$, $R_3$ and $R_4$, $R_5$, $R_6$, wherein $R_3$ and $R_6$ are, more particularly, potentiometers) are selected to provide an appropriate amount of gain to drive the following phase locked loop chips in the remainder of the circuit, described below.

The amplified signals emitted from the operational amplifiers (14, 16) are passed to phase locked loops (PLL) (18, 19, 20, 21), which are set to detect particular frequencies. The circuitry pictured is constructed to respond to the frequencies presented by DTMF tones emitted on dialing touchtone telephone keys star (*) and 3.

Under the DTMF system, each key of the telephone key pad generates a high frequency tone and a low frequency tone when depressed. The star (*) key generates a 1336 Hz high frequency tone and a 941 Hz low frequency tone; the 3 key generates a 1477 Hz high frequency tone and a 697 Hz low frequency tone. In this embodiment, DTMF tones were chosen because they are well understood and heavily utilized in the telephone industry, however, any signalling format can be chosen, and the recognition circuitry of the program material screening device may be changed accordingly.

Returning to FIG. 3, phase locked loop 18 is set to respond to a 1336 Hz signal, which is the high tone of a dialed * dual tone. Phase locked loop 19 is set to respond to 1477 Hz, the high tone of a dialed 3 dual tone. Phase locked loop 20 is set to respond to a 941 Hz signal, which is the low tone of a dialed * dual tone. Phase locked loop 21 is set to respond to a 697 Hz signal, which is the low tone of a dialed 3 dual tone. The circuitry is set to respond to a dialed *, 3, * MCS, which repeats the * tone, however if three different tones are desired, then additional phase locked loops will be required. In this embodiment, four PLL's are needed, since four PLL's are necessary to detect the four discrete frequencies of the * and 3 tones. In another embodiment, a DTMF decoder chip can be used to provide binary coded decimal output given a DTMF tone input. Appropriate digital decoding would necessarily be provided. In still another embodiment, a serial digital data stream could be used and a common modem could form part of the MCS recognition circuitry.

The power requirements of the screening device (12) can be satisfied in any number of ways. Alternating current (AC) power with a step down transformer and a voltage regulator can be used where there is no fear of tampering, since disconnecting the power supply would deactivate the device, while maintaining the integrity of the telephone system. An auxiliary battery can also be used with the appropriate voltage regulators. A lock can be used to prevent battery removal. In the FIG. 3 embodiment, a low voltage power supply, e.g., 5 v. is employed. It is also possible to draw the power off of the telephone line itself. The current drain required for the operation of the device would be below the FCC requirements, and such techniques are often used in the art.

Since DTMF tones are used in this embodiment, the telephone owner can test the operability of the screening device by depressing *, 3, * sequence on a touch tone telephone. This emits the same tones as the MCS and will result in a disconnect if the screening device is functioning properly. Also, because the *, 3, * sequence is not part of any normal telephone number, accidental triggering of the device is avoided.

Returning to FIG. 3, an incoming * tone of the MCS prefacing the adult prerecorded message (10) results in signals being generated in the appropriate phase locked loops (18 and 20) corresponding to the * dual tone. Similarly, when a an incoming 3 dual tone enters the circuit via the incoming signal (10), signals are generated from the corresponding phase locked loops (19 and 21). The signals (22, 23, 24, 25) emitted from the phase locked loops (18–21), resulting from recognition of the specific MCS tones, pass to digital logic circuitry, which causes the screening device (12) to take appropriate action based on the presence of the MCS in the incoming message signal (10). Preferably, complimentary metallic oxide semiconductor circuitry (CMOS) will be employed, which minimizes power requirements, among other advantages.

In this embodiment, a package of four 2-input NAND gates (26, 27, 28, 29) is used. Input signals (22 and 24) representing an incoming star (*) MCS enter one NAND gate (26), generating a signal to two one-shot multi-vibrators (30 and 31). The one-shot multi-vibrators (30, 31) output impulses for two different durations, e.g., 1.5 seconds and 0.5 second as shown in FIG. 3. The impulses from these one-shot multi-vibrators (30 and 31) are input to NAND gate 28, and while both one-shot multi-vibrators (30 and 31) are asserted, NAND gate 28 outputs a signal to the fourth NAND gate (29).

The signals (23 and 25) generated by the 3 dual tone MCS pass to a NAND gate (27), generating, in turn, an impulse to a third one-shot multi-vibrator (32) having an output impulse of 1.0 second. The output of this one-shot multi-vibrator (32) passes to the fourth NAND gate (29), and when impulses from both NAND gate 28 and one-shot multivibrator (32) are received at the fourth NAND gate 29, an output signal is generated from the fourth NAND gate 29 to activate a 3-second one-shot multi-vibrator (33).

Activation of the one-shot 33 opens a nonlatching type relay (40), resulting in a 3-second interruption of the telephone connection, which, in turn, will cause the central switching equipment of the telephone utility to disconnect or drop the caller, the same as if the caller had returned the telephone handset to the cradle for three seconds.

Obviously, myriad combinations of NAND gates and one-shot multi-vibrators are suggested by the foregoing disclosure and the particular circuitry and timing of the circuit is not critical to the invention. The particular embodiment of the present invention depicted in FIG. 3 is particularly suitable for a material content signal recorded on a taped telephone message of *, 3, *, having a cadence of 0.5 second per tone. At the first star (*) tone, the 1336 Hz and 941 Hz tones are detected, then NAND gate 26 is asserted, then one-shots 30 and 31 are asserted, and NAND gate 28 is activated for 0.5 second (the duration of the output from one-shot 31). After 0.5 second of the star (*) tone, the MCS input switches to the 3 dual tone, activating the 1477 Hz and 697 Hz phase locked loops (19 and 21) and generating signals (23 and 25) to NAND gate 27, in turn activating the 1-second one-shot (32).

The impulse from the 1-second one-shot 32 passes to NAND gate 29; however, input from NAND gate 28 has ceased because of the completion of the signal from the 0.5-second one-shot (31).

In the third 0.5-second interval of the MCS, the second star (*) tone again activates the circuitry through NAND gate 28. Output is generated from NAND gate 29 at this point, because impulses from both NAND gate 28 and the still-activated 1-second one-shot 32 are received. The impulse from NAND gate 29 sets-off the one-shot 33, opening the relay (40) and disconnecting the telephone for 3 seconds.

Also provided in this embodiment is a defeat key (50), which allows the telephone owner to bypass the telephone screening circuitry (12) and receive the incoming prerecorded messages (10) without interference. In embodiments where wider differentiation between incoming signals is desired, such as where the incoming signal (10) may carry program material of different MPAA ratings (PG, PG-13, R) as well as explicit adult (X) ratings, the defeat key (50) will allow for the activation of some circuits while defeating others, thereby allowing transmission of selected programming (e.g., G-rated programming) while blocking out the reception of other programming (e.g., PG-13, R, X-rated programming). Of course, in order to differentiate between such programming, multiple material content signals will be used, and the recognition and execution circuitry will be correspondingly multiplied.

In practicing the method of the present invention, within the embodiment of a telephone system, the screening device is simply connected in series to an incoming telephone line before the telephone itself. When an adult message provider is called on the telephone line, the provider plays the prerecorded message, containing the MCS message tones, and these tones will activate the screening device as described above. These tones may be peculiar to the type or rating of the message which follows the tones on the prerecorded tape. Alternatively, the tone can be provided throughout the recording. Naturally, message providers will choose the best method for their particular business, but their only responsibility, to effect the method, would be to emit the tones by one procedure or another, in conjunction with their messages. In effect, the message providers could electronically "rate" themselves. They identify the content of the messages they will wish to transmit to callers, and provide material content signals accordingly. This invention can be expanded to allow self-identification for all types of telephone calls, and the decoders in the homes, businesses, or coin telephones can be "programmed" to selectively screen out any particular type of telephone call, from various sources or even parties. For example, if the telephone number being called were provided with its own identification code, calls between particular telephones could be prevented. Such an arrangement would be useful, for example, in cases of telephone harassment where the harassing calls originated from particular telephones. Such an arrangement also could be used to regulate the amount of time children spend talking to friends on the telephone.

In practice, the screening device of this invention can be placed at the terminal block in the home, or on all incoming or outgoing lines to a PBX system. It can be placed on pay telephones, or built into the wall plate jack or disguised in a modular plug housing of a home telephone. If the terminal block approach is used, the entire premises or home is protected. If the wall plate approach is taken, only that individual phone will be screened. Furthermore, the invention can be integrated into actual telephones. This approach makes selective deactivation of the screening device easier. A key or combination type thumbwheel lock can be used to deactivate the device. The screening device can also be hidden anywhere in line with the telephone to be screened. For example, it could be out on the telephone line or on the telephone pole. However, it is also an object of the present invention to allow the homeowner to install his own screening device. The telephone pole installation would not be so desirable for this, but any location in series between the telephone pole and the calling telephone set is satisfactory.

The screening device can be a fixed type set only to block adult messages, or it can be a programmable type able to selectively screen calls. It can be powered by batteries, or can draw its small amount of required power from the telephone line itself. In applications where there is no reason to fear that a minor, employee, or the like may seek to sabotage the operation of the screening device, even AC power with a step-down transformer can be used to power the device. This would be especially true in businesses where the device is located in a locked telephone closet.

When the device is activated by the MCS, there are several alternating formats for the screening function. One screening format, described above, may be that the device instructs its series relay to disconnect the telephone line for a long enough period to cause a central office disconnect to occur. Here, the caller dialing the adult message provider is disconnected immediately. The lines would then be reconnected, but only a dial tone would be heard. An alternative format would be that the device would respond to the MCS by emitting a masking tone, or by sending narrow disconnect pulses back to the central office.

Figure 4:
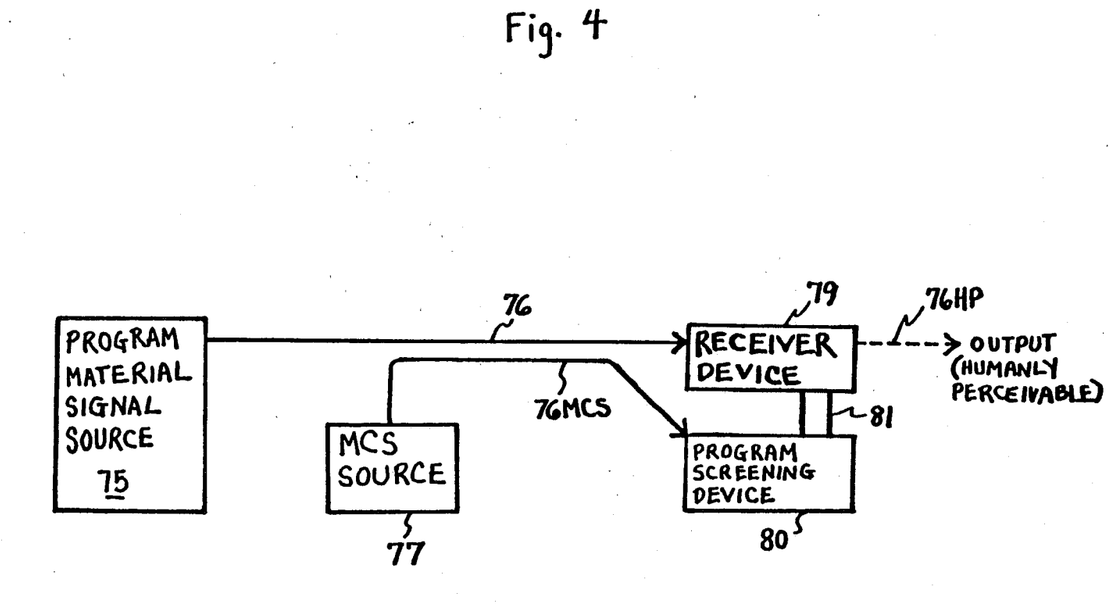
FIG. 4 is an overall schematic diagram of the method and improvement of the present invention.
Figure 5A:
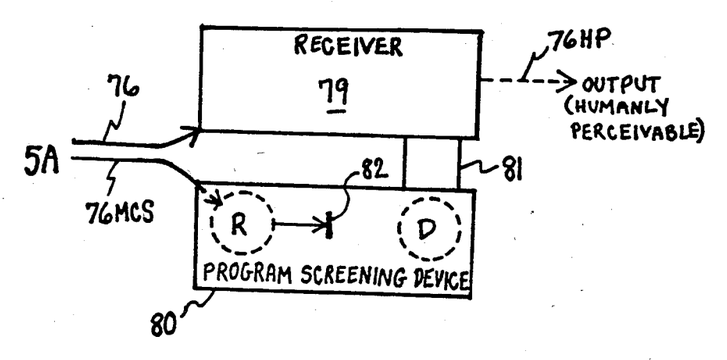
FIGS. 5A and 5B are schematic diagrams of the device according to the present invention.
Figure 5B:
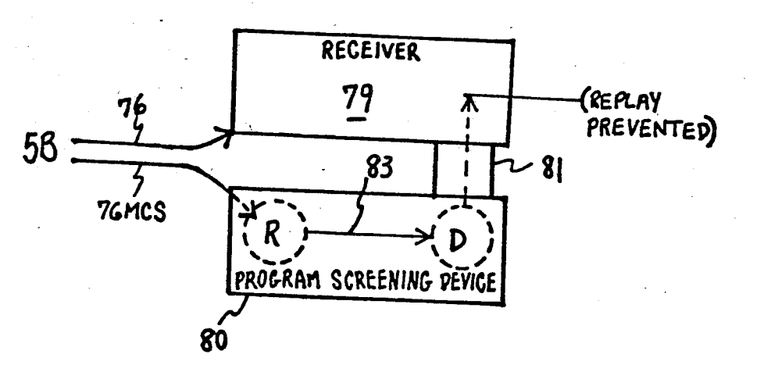

Many modifications and variations of the present invention will be immediately apparent from the foregoing description. For instance, referring to FIG. 4, a general scheme for the method and improvement of the present invention is set forth. As shown in FIG. 4, a program material signal source (75) transmits a program material signal (76) which is electronically detectable by a receiver device (79), which receiver device (79), in turn, is capable of recognizing and replaying the program material signal (76) in a humanly perceivable form (76HP). The program material signal (76) is supplemented with a material content signal (76MCS) from a source (77), and the material content signal (76MCS) is electronically detectable by a program material screening device (80). The receiver device (79) is connected (at 81) to a program material screening device (80) such that the receiver device (79) may be automatically selectively disabled by the program material screening device (80) in response to detection of the material content signal (76MCS), thereby preventing replay of the program material (i.e., the humanly perceivable output signal (76HP) is not produced). FIGS. 5A and 5B represent a program material screening device (80) connected (at 81) to a receiver (79). The program material screening device is provided with recognition means (R) for detecting a material content signal (76MCS) and disabling means (D) for automatically preventing replay of the program material signal by the receiver (79). FIG. 5A depicts a situation in which the receiver operator has selected to receive all program material signals (76) without interruption, and the program material screening device (80) has been set so that the recognition means is cut off (shown at 82) from the disabling means (D), so that reception of the material content signaL (76MCS) by the program material screening device (80) does not affect reception and replay of the program material signal (76, 76HP) by the receiver (79). FIG. 5B depicts a situation in which the receiver operator has selected not to receive certain program material, and accordingly the recognition means (R) is engaged (shown by arrow 83) with the disabling means (D) so that upon reception by the program material screening device (80) of the material content signal (76MCS), replay of the program material signal (76) by the receiver is prevented. In the schemes depicted in FIGS. 4, 5A and 5B, the receiver device (79) can be any device capable of electronically detecting a program material signal (76). Such receiver devices include telephones, video cassette recorders, televisions, radios, record players, tape players, film projectors and computers. Correspondingly, the program material signal may be any type of signal electronically detectable by the receiver (79) which can be recognized and replayed in humanly perceivable form. Such program material signals include, therefore, telephone signals, signals recorded on magnetic video tape, television signals, radio signals, signals recorded on phonograph records, signals recorded on magnetic tape, signals embodied or imprinted on photographic film, signals recorded on computer readable disks, microchips or tapes, as well as infrared radiation signals, wire transmission, satellite transmissions and microwaves. Likewise, the material content signal (76MCS) may independently be any type of signal electronically detectable by a program material screening device according to the invention, and such signals will include telephone signals, signals recorded on magnetic video tape, television signals, radio signals, signals recorded on phonograph records, signals recorded on magnetic tape, signals embodied or imprinted on photographic film, signals recorded on computer-readable disks, microchips and tapes, as well as infrared radiation signals, wire transmissions, satellite transmissions and microwaves. All such modifications and variations, however, are fully contemplated herein and are intended to be encompassed within the scope of the appended claims.

I claim:

1. A method for selectively screening program material comprising
    (1) transmitting to one or more receiver devices a program material signal which is electronically detectable by each receiver device, each receiver device being capable of recognizing and replaying said program material signal in a humanly perceivable form,
    (2) supplementing the program material signal with a material content signal electronically detectable by a program material screening device, wherein said material content signal does not interfere with transmission of the program material signal or reception thereof by a receiver device not connected to a program material screening device, and
    (3) connecting at least one of said one or more receiver devices to a program material screening device such that upon detecting said material content signal, said program material screening device, on the authorization of the receiver device user, automatically selectively disables at least one of the one or more receiver devices connected to a program material screening device from receiving and/or replaying said program material signal.

2. In a communication system wherein a program material signal is transmitted to one or more receivers capable of recognizing and replaying said program material signal in a humanly perceivable form, the improvement wherein (1) said program material signal is supplemented with a material content signal which is detectable by a program material screening device and which does not interfere with transmission of said program material signal or reception thereof by a receiver not connected to a program material screening device, and (2) at least one of said receivers is connected to a program material screening device capable of automatically preventing, at the selection of the receiver user, reception and/or replay of the program material signal by the receiver in response to detection of the material content signal by said screening device.

3. A program material screening device adapted to be connected to a program material receiver capable of recognizing and replaying a transmitted program material signal in humanly perceivable form, comprising (a) recognition means for detecting any supplemental material content signal transmitted with said program material signal and (b) disabling means for automatically selectively preventing, at the selection of and under the direct authorization of the receiver user, replay of the program material signal by the receiver upon detection of a material content signal by said recognition means.

4. A method according to claim 1, wherein said receiver device is a telephone, a video cassette recorder, a television, a radio, a record player, a tape player, a film projector, or a computer.

5. A method according to claim 1, wherein said program material signal is embodied in radio signals, television signals, telephone signals, satellite transmissions, wire transmissions, microwaves, infrared radiation, or is recorded on magnetic tape, records, microchips or laser readable discs.

6. A method according to claim 1, wherein said material content signal is embodied in radio signals, television signals, telephone signals, satellite transmissions, wire transmissions, microwaves, infrared radiation, or is recorded on magnetic tape, records, microchips, or laser readable discs.

7. A method according to claim 1, wherein said material content signal is transmitted simultaneously from the same source as the program material signal.

8. A method according to claim 1, wherein said material content signal is transmitted from a different source than the program material signal.

9. The improvement according to claim 2, wherein said receivers are telephones, video cassette recorders, televisions, radios, record players, tape players, film projectors, or computers.

10. The improvement according to claim 2, wherein said program material signal is embodied in radio signals, television signals, telephone signals, satellite transmissions, wire transmissions, microwaves, infrared radiation, or is recorded on magnetic tape, records, microchips or laser readable discs.

11. The improvement according to claim 2, wherein said material content signal is embodied in radio signals, television signals, telephone signals, satellite transmissions, wire transmissions, microwaves, infrared radiation, or is recorded on magnetic tape, records, microchips, or laser readable discs.

12. The improvement according to claim 2, wherein said material content signal is transmitted simultaneously from the same source as the program material signal.

13. The improvement according to claim 2, wherein said material content signal is transmitted from a different source than the program material signal.

14. A screening device according to claim 3, wherein said receiver is a telephone, video cassette recorder, television, radio, record player, tape player, film projector, or computer.

15. A screening device according to claim 3, wherein said program material signal is embodied in radio signals, television signals, telephone signals, satellite transmissions, wire transmissions, microwaves, infrared radiation, or is recorded on magnetic tape, records, microchips or laser readable discs.

16. A screening device according to claim 3, wherein said material content signal is embodied in radio signals, television signals, telephone signals, satellite transmissions, wire transmissions, microwaves, infrared radiation, or is recorded on magnetic tape, records, microchips or laser readable discs.

17. A screening device according to claim 3, wherein said material content signal is transmitted simultaneously from the same source as the transmitted program material signal.

18. A screening device according to claim 3, wherein said material content signal is transmitted from a different source than the transmitted program material signal.

19. A telephone message screening device adapted to be connected in series between a telephone message source and a telephone, comprising (a) recognition circuitry capable of detecting one or more series of incoming dual tone multi-frequency signals prefacing or comprising a part of an incoming telephone message and (b) disconnect circuitry connected to said recognition circuitry such that on detection of one or more series of incoming dual tone multi-frequency signals by said recognition circuitry, said disconnect circuitry automatically prevens or interrupts said telephone from receiving telephone messages.

20. A telephone message screening device as defined in claim 19, wherein said disconnect circuitry prevents or interrupts telephone messages in response to some but not all of the series of incoming dual tone multi-frequency signals detected by said recognition circuitry.

* * * * *